United States Patent [19]

Klimmek et al.

[11] 4,242,159

[45] Dec. 30, 1980

[54] PROCESS FOR THE PRODUCTION OF COMPOSITE MEMBRANES

[75] Inventors: Albrecht Klimmek; Wolfram Krieger, both of Frankfurt am Main; Roland Reiner, Eschborn, all of Fed. Rep. of Germany

[73] Assignee: Battelle-Institut e.V., Frankfurt am Main, Fed. Rep. of Germany

[21] Appl. No.: 14,952

[22] Filed: Feb. 26, 1979

[30] Foreign Application Priority Data

Feb. 25, 1978 [DE] Fed. Rep. of Germany ....... 2808222

[51] Int. Cl.² .................... B32B 31/12; B01D 39/16
[52] U.S. Cl. .................... 156/155; 156/230; 156/236; 210/490; 210/500.2; 210/506
[58] Field of Search .................... 156/155, 230, 236; 210/490, 500 M, 506

[56] References Cited

U.S. PATENT DOCUMENTS

| | | | |
|---|---|---|---|
| 3,671,007 | 6/1972 | Bailey et al. | 249/114 |
| 3,969,452 | 7/1976 | Ciliberti et al. | 210/500 M X |
| 3,979,274 | 9/1976 | Newman | 156/230 X |
| 4,005,012 | 1/1977 | Wrasidlo | 210/23 H |

FOREIGN PATENT DOCUMENTS 1267167 3/1972 United Kingdom .................... 427/244

*Primary Examiner*—Evan K. Lawrence
*Attorney, Agent, or Firm*—Fisher, Christen & Sabol

[57] ABSTRACT

A process for the production of a composite membrane consisting of a porous supporting membrane and a thin separating membrane. The separating membrane is produced on the surface of a carrier film (consisting essentially of a soluble polymer). The carrier film coated with the separating membrane is placed with its separating membrane side on a porous supporting membrane such that the separating membrane is between the supporting membrane and the carrier film. The carrier film is then dissolved.

13 Claims, No Drawings

PROCESS FOR THE PRODUCTION OF COMPOSITE MEMBRANES

BACKGROUND OF THE INVENTION

1. Field of the Invention

This invention relates to a process for the production of composite membranes which consist of a porous supporting membrane and a thin separating membrane.

2. Prior Art

Selectively permeable membranes made from different polymers are used in hyperfiltration, i.e., reverse osmosis, for the desalination of sea and brackish water, for sewage and effluent treatment and for the recovery of valuable substances from sewage and effluent. The profitability of such method depends on the efficiency of the membrane, the water flow being determined by the operating pressure and the thickness of the membrane. Efforts have been made to produce membranes as thin as possible (between 0.1 and 1 $\mu$m), since the water flow is more profuse when the membrane is thin.

Either asymmetric membranes or composite membranes are used as membranes with extremely thin separating layers of less than 1 $\mu$m. Asymmetric membranes, which are produced by precipitation reactions, have a dense, thin separating layer, which represents the actual membrane, and a porous substructure. The separating layer and the substructure are usually made from the same material. Conventional composite membranes consist of a porous supporting membrane, to which the actual separating membrane is applied. The supporting membrane and the separating membrane may be made of different materials. Composite membranes are either produced by interface polymerization of the components forming the separating membrane on the supporting membrane, or by applying a polymer solution to the supporting membrane followed by evaporation of the solvent.

In interface polymerization the supporting membrane is successively brought into contact with solutions of the reaction components which form the separating membrane. Since the solvents are immiscible with each other, a thin polymer film which prevents the further reaction of the two components is formed by the reaction at the interface of the solvents. However, such process can only be used for a few types of polymer synthesis and the solvents required often attack the material of the supporting membrane, destroying its structure.

The process in which the separating membrane is formed by applying a polymer solution on the supporting membrane and evaporating the solvent, requires the use of a highly diluted solvent (i.e., large amounts of solvent). After evaporation of the solvent, a homogeneous continuous polymer layer is obtained, whose thickness depends upon the polymer concentration. In such process it is important that the casting solution does not penetrate the pores of the supporting membrane and clog them. To prevent the pores from becoming clogged and to prevent the supporting membrane from being corroded, a barrier layer (which is made of a material that can later be dissolved) is applied to the porous supporting membrane and finally coated with the casting solution. If the supporting membrane is not masked in this way, only those solvents which do not effect the material of the supporting membrane may be used. The high-performance materials for the production of separating membranes are, however, only soluble in those solvents which destroy the material of the supporting membranes. Such solvents which are currently available are, for example, polysulfone, cellulose acetate and others. The casting solution can also penetrate into the pores of the supporting membrane and thus prevent the formation of a thin, dense separating membrane.

Although composite membrane production with prior masking of the supporting membrane makes it possible to produce thin, uniform separating membrane layers, total removal of the masking layer often creates major difficulties. When the composite membrane produced in such manner is used for the first time the masking material contaminates the permeate (e.g., see French Patent No. 2,322,637).

According to a conventional process, asymmetric ultrafiltration membranes are produced on a molded part of silicone rubber (see German Patent Application No. 2,132,323). A composite of the separating membrane with the support is not produced. The molded part is removed mechanically.

Another process is known in which a polymer solution is applied to a carrier and then one component of the carrier material is extracted so that a porous supporting structure occurs (see British Patent No. 1,267,167). The carrier may only contain material not contained in the separating layer.

Providing the surface of the membrane with a water-soluble film subsequent to the formation of the membrane has already been suggested as a means of protecting the sensitive surface of the membrane (see French Patent No. 2,324,338). But such process can only be used with certain polymers, and, in the production of the separating layer, the soluble polymer film does not act as a carrier.

SUMMARY OF THE INVENTION

An object of this invention is to develop a process for the production of composite membranes which makes it possible to avoid the disadvantages described above. Other objects and advantages of this invention are set out herein or are obvious herefrom to one ordinarily skilled in the art.

The objects and advantages of this invention are achieved by the process of this invention.

The problems of the prior art are solved in a technically advanced way when, in accordance with the process of this invention, the separating membrane is produced on the surface of a carrier film which is made of a soluble polymer, when the carrier film coated with the separating membrane is placed with its separating membrane side on a porous supporting membrane, so that the separating membrane is between the supporting membrane and the carrier film, and when the carrier film is then dissolved.

This invention involves a process for the production of a composite membrane consisting of a porous supporting membrane and a thin separating membrane. The process includes producing (e.g., coating) a separating membrane on the surface of a carrier film consisting essentially of a soluble polymer. The carrier film coated with the separating membrane is placed with its separating membrane side on a porous supporting membrane such that the separating membrane is between the supporting membrane and the carrier film. The carrier film is then dissolved.

The process according to this invention is suitable for the production of a thin, high-performance composite membrane from all polymer casting solutions. The only decisive criterion for the selection of the material to be used as the soluble carrier film is its behavior in the solvent of the actual separating membrane.

DESCRIPTION OF THE PREFERRED EMBODIMENTS

The carrier film should perferably consist essentially of a water-soluble material. In separation processes, for example, in organic solvents, such polymers may be used in making the carrier film which is soluble in the media involved in the particular case in question. Preferable polymers with filmforming properties are, for example, polyvinyl alcohol, partially acetylated polyvinyl alcohol, polyacrylic acid, polymethacrylic acid, alginic acid, polyvinyl pyrrolidone, polyacrylamide, polyvinyl acetate, copolymers of the aforegoing, sodium carboxymethylcellulose, methylcellulose, ethylcellulose and salts of all the aforegoing acids, preferably with polyvalent metal cations. All of the aforegoing can be used as the water-soluble material. In separation processes in organic solvents, the carrier film can be made of a polymer having film-forming properties and which is insoluble in the solvent of the separating membrane material. Examples of such are cellulose acetate, polyvinyl acetate (soluble in acetone), cellulose nitrate (soluble) in acetone/water) and cellulose (soluble in Schweitzer's reagent).

The carrier film perferably contains up to 50 weight percent of a plasticizer(s), related to the weight of the polymer. Most preferably 10 to 20 weight percent of a plasticizer is used. Glycerol, polyethylene glycol or sorbite, for example, can be used as the plasticizer for polyvinyl alcohol.

In a further favorable embodiment of the process according to this invention, a wetting agent is used which improves the wetting of the soluble carrier film by the polymer solution which is used to produce the separating membrane. This means that thinner, more dense, separating membrane layers are obtained. The wetting agent is applied to the surface of the carrier film and then the separating membrane layer is produced (e.g., coated) on it. In an advantageous embodiment, the wetting agent is incorporated into the separating membrane and/or the carrier film when they are produced, i.e., it is admixed into the solutions of the polymers for the separating membrane or the carrier film. Suitable wetting agents are, for example, fluorinated and non-fluorinated non-ionic detergents.

The process according to this invention produces composite membranes which are suitable, in particular, for the production of coiled modules. The arrangement where the separating membrane is between the supporting membrane and the carrier film has the further advantage that the thin, mechanically-not-very-stable separating membrane is protected in the module by the carrier film from mechanical damage until the start of the separation process. This protection is particularly important in the production of coiled modules since the membrane thus has no direct contact with the spacers. When the module is to be used, the soluble carrier film is then washed off with water, the crude solution or a suitable solvent, so that the separating membrane is ready for use.

As used herein, all parts, weights and ratios are on a weight basis unless otherwise stated herein or otherwise obvious herefrom to one ordinarily skilled in the art.

EXAMPLE 1

A polyvinyl alcohol film is produced by spreading a 15 percent solution in water on a polished glass plate using a 200 $\mu$m coating knife and allowing it to dry in a vacuum for two hours at 50° C. A solution of 5 percent of polyamide (poly-5-methoxyisophthal-4, 6-dimethoxy-m-phenylenediamide) in N,N-dimethylacetamide is poured over this approximately 30 $\mu$m thick carrier film. The film is allowed to drain for 30 seconds and finally dried in a vacuum. The coated carrier film is then placed so that the polyamide side is on a porous supporting membrane (asymmetric ultrafiltration membrane; polysulfone, medium pore diameter on the separating side ca. 10nm) and is subjected to a hyperfiltration experiment in a flow testing chamber.

Experimental conditions:
3.5 percent sodium chloride solution working pressure of 100 bar 25° C.
Salt retention capacity:
93.3 percent
Water flow:
32.4 $1/m^2d$
Separating membrane thickness:
1.86 $\mu$m

EXAMPLE 2

A polyvinyl alcohol film, plasticized with 20 percent of glycerol, is treated with a 4 percent polyamide solution as described in Example 1.

Using the experimental conditions described in Example 1, a salt retention capacity of 97.8 percent and a water flow of 89.6 $1/m^2d$ are determined for the coated carrier film of this example. The thickness of the separating membrane is 0.50 $\mu$m.

EXAMPLE 3

A polyvinyl alcohol film, plasticized with 10 percent of polyethylene glycol 800, is treated twice with a solution of 1.75 percent of polyamide in dimethylacetamide according to the process of Examiner 1.

Using the hyperfiltration experiment described in Example 1, a salt retention capacity of 93.0 percent and a water flow of 170 $1/m^2d$ are determined for the coated carrier film of this example. The thickness of the separating membrane is 0.25 $\mu$m.

EXAMPLE 4

A 30 $\mu$m thick film of sodium carboxymethylcellulose, plasticized with 15 percent of glycerol, is treated twice with a 1.5 percent polyamide solution as described in Example 1.

Using the hyperfiltration experiment described in Example 1, a salt retention capacity of 92.2 percent and a water flow of 62.7 $1/m^2d$ are determined for the coated carrier film of this example. The thickness of the separating membrane is 0.72 $\mu$m.

EXAMPLE 5

A composite membrane is produced according to the process of Example 4. The porous supporting membrane (asymmetric ultrafiltration membrane) of the composite membrane is made of polyacrylonitrile having a medium pore diameter of 10 nm. The porous carrier membrane (ultrafiltration membrane) of the composite membrane is made of cellulose-2,5-acetate having a medium pore diameter of 10 nm.

Hyperfiltration experiments for the composite membrane of this example produces the same results as in Example 4 with a tolerance of ±5 percent in the water flow.

EXAMPLE 6

An approximately 30 μm thick film (consisting of 67 percent of polyvinyl alcohol and 33 percent of sodium carboxymethylcellulose, plasticized with 11 percent of polyethylene glycol 800) is treated twice with a solution of 1.75 percent of polyamide in N,N-dimethylacetamide as described in Example 1.

Using the hyperfiltration experiment described in Example 1, a salt retention capacity of 89.8 percent and a water flow of 51.2 $l/m^2d$ are determined for the coated carrier film of this example. The thickness of the separating layer is 0.84 μm.

EXAMPLE 7

A polyvinyl alcohol film (produced as described in Example 3) is treated four times as described in Example 1 with a solution of 1 percent of polyamide (poly-5-methoxyisophthal-4,6-dimethoxy-m-phenylenediamide) in N,N-dimethyl-acetamide, to which 0.2 percent, related to the polymer, of a non-ionic fluorinated wetting agent is added.

Using the hyperfiltration experiment described in Example 1, a salt retention capacity of 98.3 percent and a water flow of 125.4 $l/m^2d$ are determined for the coated carrier film of this example. The thickness of the separating membrane is 0.34 μm.

EXAMPLE 8

A polyvinyl alcohol film (produced as described in Example 3) is treated twice as described in Example 1 with a solution of 0.2 percent of cellulose triacetate in chloroform.

Using the hyperfiltration experiment described in Example 1, a salt retention capacity of 99.5 percent and a water flow of 115.2 $l/m^2d$ are determined for the coated carrier film of this example. The thickness of the separating membrane is 0.39 μm.

EXAMPLE 9

A polyvinyl alcohol film (produced as described in Example 3) is treated twice as described in Example 1 with a solution of 0.5 percent of polymide (poly-1,5-cyclo-octadiene-1,2,5,6,-tetracarboxylic acid-4,6-dimethoxy-m-phenylenediamide) in m-cresol.

Using the hyperfiltration experiment described in Example 1, a salt retention capacity of 80.7 percent and a water flow of 101.5 $l/m^2d$ are determined for the coated carrier film of this example. The thickness of the separating membrane is 0.68 μm.

EXAMPLE 10

A polyvinyl alcohol film (produced as described in Example 3) is treated twice as described in Example 1 with a solution of 0.5 percent of a copolymer of acrylonitrile and vinyl sulfonic acid (ratio 6:1) in N-methyl pyrrolidone.

Hyperfiltration using a solution containing 5 percent of silver nitrate and 5 percent of copper nitrate with water of crystallization produces the following results at a working pressure of 60 bar at 25° C.
Retention capacity $AgNO_3$:
−54.8 percent (enrichment in the permeate)
Retention capacity $Cu(NO_3)_2.3H_2O$:
95.8 percent
Water flow:
40.5 $l/m^2d$
Separating membrane thickness:
1.49 μm.

What is claimed is:

1. In a process for the production of a composite membrane consisting of a porous supporting membrane and a thin separating membrane, the improvement characterized by the steps of producing a separating membrane on the surface of a carrier film consisting essentially of at least one soluble polymer, placing the carrier film having the separating membrane thereon with its separating membrane side on a porous supporting membrane such that the separating membrane is between the supporting membrane and the carrier film, and then dissolving the carrier film.

2. Process as claimed in claim 1 wherein the carrier film contains at least one soluble polymer selected from the group consisting of polyvinyl alcohol, partially acetylated polyvinyl alcohol, polyacrylic acid, a salt of polyacrylic acid, polymethacrylic acid, a salt of polymethacrylic acid, polyvinylpyrrolidone, polyacrylamide, polyvinyl acetate, a copolymer of the aforegoing, alginic acid, a salt of alginic acid, carboxymethylcellulose, cellulose acetate, cellulose, polycarbonate, and a mixture of one or more of the aforegoing.

3. Process as claimed in claim 2 wherein the carrier film is 5 to 100 μm thick.

4. Process as claimed in claim 1 wherein the carrier film consists essentially of a water-soluble polymer.

5. Process as claimed in claim 4 wherein the carrier film is 5 to 100 μm thick.

6. Process as claimed in claim 5 wherein the carrier film is 20 to 30 μm thick.

7. Process as claimed in claim 4 wherein the carrier film contains up to 50 weight percent, related to the weight of the polymer, of a plasticizer.

8. Process as claimed in claim 7 wherein the carrier film contains 10 to 20 weight percent, related to the weight of the polymer, of a plasticizer.

9. Process as claimed in claim 7 wherein the polymer is polyvinyl alcohol and the plasticizer for the polyvinyl alcohol is polyethylene glycol or sorbite.

10. Process as claimed in claim 1 wherein the carrier film is produced from a polymeric solution to which a nonionic wetting agent has been added.

11. Process as claimed in claim 1 wherein the carrier film contains up to 50 weight percent, related to the weight of the polymer, of a plasticizer.

12. Process as claimed in claim 1 wherein the production step is achieved by coating said separating membrane on said carrier layer.

13. Process as claimed in claim 1 wherein the separating membrane is produced from a polymeric solution to which a nonionic wetting agent has been added.

* * * * *